J. C. SHERMAN.
TRANSMISSION OF POWER FOR USE IN VEHICLES.
APPLICATION FILED APR. 6, 1911.
1,060,714.
Patented May 6, 1913.
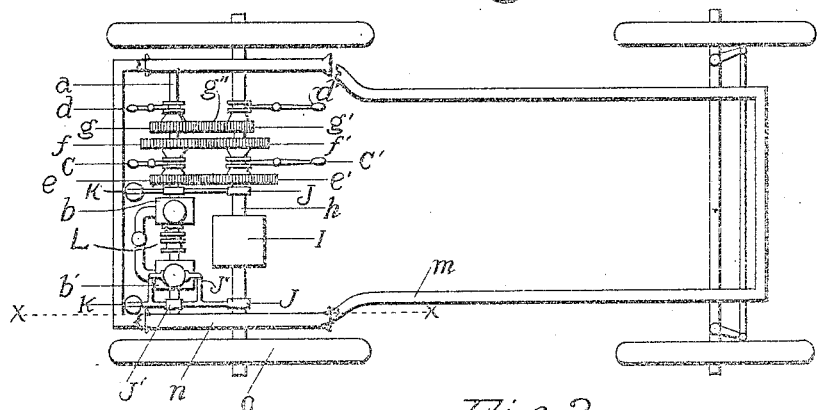
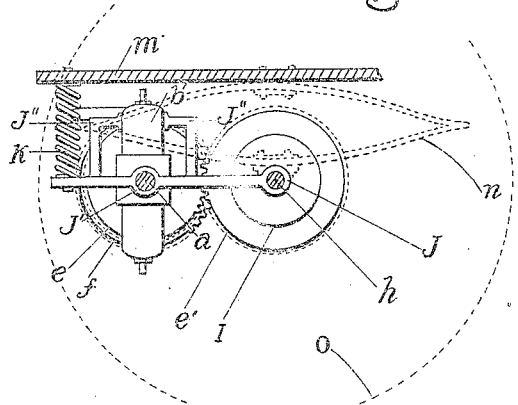
WITNESSES:
Mabel A. Sherman
Thos. P. Sherman
INVENTOR:
John C. Sherman

UNITED STATES PATENT OFFICE.

JOHN C. SHERMAN, OF BROOKLINE, MASSACHUSETTS.

TRANSMISSION OF POWER FOR USE IN VEHICLES.

1,060,714.

Specification of Letters Patent.

Patented May 6, 1913.

Application filed April 6, 1911. Serial No. 619,421.

*To all whom it may concern:*

Be it known that I, JOHN CARLETON SHERMAN, a citizen of the United States, residing at Brookline, in the county of Norfolk and State of Massachusetts, have invented certain new and useful Improvements in the Transmission of Power for Use in Vehicles, of which the following is a specification.

In my invention I place the engine with its shaft parallel to the shaft to which power is required to be transmitted, and herein known as the driven shaft, such as the rear axle of an automobile, and suspend the engine by resilient means from the body of the vehicle so that it may respond to vibrations, as those transmitted thereto by a rough road, without imparting great and sudden stresses to the vehicle body; and I mount upon the shaft of said engine a plurality of gear wheels through the intermediary of clutches whereby any one of said gear wheels may be caused to rotate with the engine shaft when so desired; I also mount upon the driven shaft a plurality of gears each of which is provided with clutch means whereby it may be caused to rotate fixedly with said shaft when so desired. I cause the gear wheels on the engine shaft to remain permanently in mesh with the gear wheels corresponding thereto on the driven shaft, irrespectively of any motion which the engine may take on because of its resilient suspension, by providing one or more rigid radius rods which are pivoted upon the center line of the driven shaft and fixed to some fixed support upon the engine or its framing.

As this new method of transmission is believed to be particularly desirable for use in connection with the improved engine described in my U. S. Patent of November 3, 1908, No. 902,692, I show in this present instance a clutch in the engine-shaft, such as is used in my prior patent, whereby one or more engine cylinders may be caused to cease revolving and be thrown out of operation when so desired and properly returned to operation when so desired.

Referring to the accompanying drawings which illustrate conventionally the embodiment of my invention, Figure 1 represents in plan view a motor carriage chassis and running gear equipped with one form of my invention. Fig. 2 represents, on a scale substantially twice the scale of Fig. 1, a vertical cross-section of chassis running gear and my invention taken through the line X X of Fig. 1.

In Fig. 1 the engine shaft is indicated at $a$. Two pairs of opposed 2-cycle gas engine cylinders with all necessary parts and packings are indicated respectively at $b$ and $b'$, said cylinders operating pistons and piston rods (not shown) and thereby turning cranks upon engine shaft in the usual manner. Mounted upon the shaft $a$ is a double acting friction clutching device and controlling lever therefor indicated at $c$. A second friction clutching device and controlling lever therefor is shown at $d$ similarly mounted upon shaft $a$. The friction clutching devices $c$ and $d$ are keyed to the engine shaft by means of keys and key ways which permit them to slide axially upon said shaft but which compel them to rotate with said shaft whenever the said shaft rotates. At $e$ and $f$ are cog wheels centered and borne upon shaft $a$ but free to revolve independently thereof.

When clutching device $c$ is moved by means of its lever upward (regarding its line of movement in the plane of the drawing as directed toward the top of the drawing) or to the left of the vehicle (regarding the device as existing in concrete form) it is forced into frictional contact with cog wheel $f$ and therefore if the shaft $a$ is at that time revolving the cog wheel $f$ will receive the full rotative impulse of said shaft. Meanwhile cog wheel $e$ is free to remain stationary. If said clutching device $c$ is next moved downward, or in the direction opposite to the movement just noted, it will now engage cog wheel $e$ and impart thereto the rotative impulse of shaft $a$, and during this operation cog wheel $f$ is released from engagement with $c$ and may then remain stationary until again thrown into engagement with $c$. Similarly, if $c$ is placed in its position, wherein it does not engage either $e$ or $f$, and $d$ is thrown downward it will similarly engage cog wheel $g$, which is centered upon shaft $a$ in like manner as $e$ and $f$, and $d$ will now cause the rotative impulse of shaft $a$ to be communicated to $g$. The driven shaft, in this case the rear axle of an automobile, is shown at $h$, parallel to shaft $a$. Upon this shaft is preferably mounted a differential gear housed in the casing I which casing may be constrained from rotation if desired in any convenient manner. Pivotally mounted upon said driven shaft are two or more rigid links J J. One of these links J carries rigid arms J'' which are rigidly secured to the casings of cylinders b'. Both links J also carry collars J' which surround shaft a but which are not secured fixedly thereto. Links J J also receive and are firmly bolted to the lower ends of two or more coiled springs K K preferably located rearward from the cylinders b b', and the upper ends of these springs K are bolted to the chassis m of the vehicle. Centered and mounted revolvably upon axle h are three cog wheels $e'$, $f'$ and $g'$. These are all confined by suitable collars upon the axle h so that they may revolve independently thereon but cannot move axially thereon. $e'$ is permanently in mesh with $e$; and $f'$ is permanently in mesh with $f$. $e$ and $f$ are of different diameters, $e$ corresponding to low speed and $f$ corresponding to high speed of transmission of power from engine to axle. Similarly $e'$ and $f'$ are of different diameters as required to mesh with $e$ and $f$.

It is obvious that if engine cylinders b b' are in action and I throw friction clutch $c$ down into engagement with cog wheel $e$, the latter will revolve and communicate its motion reversed in direction to $e'$. If now I throw clutch $c'$ down into engagement with $e'$ the latter already revolving will communicate its revolutions to axle h. Said operation of communicating to h the motion of $e'$ will be gradual or abrupt according to the manner of operating $c'$. Similarly if I now throw $c$ and then $c'$ upward $f$ will revolve and will cause $f'$ to revolve, and $f'$ will tend to cause axle h to revolve. The third cog wheel $g$ is in line with a cog wheel $g'$ on axle h but between the two and supported revolvably in any convenient but not illustrated manner from either a or h is an intermediate gear $g''$. If I throw clutch d down, all other clutches being at the time out of engagement with all other cog wheels, $g$ will receive the rotative impulse of a and transmit it reversed to $g''$ which will transmit it again reversed to $g'$. If now I throw down the clutch $d'$ cog wheel $g'$ will communicate its revolving impulse to axle h.

If I desire to transmit the full energy from the cylinders b b' to h I may thus employ any one of the several sets of clutches and gears as stated. But as I may at times wish to transmit less than the full energy of cylinder-pairs b b' to h I provide a special clutch L on the shaft a between cylinder-pairs b and b' whereby b' may at will be thrown into or out of service. The specific means by which I operate this clutch and its specific purpose in maintaining at high efficiency the operation of the engine cylinders are described and illustrated in U. S. Letters Patent No. 902,692 issued to me on November 3d, 1908, and need here be no further described. Between the axle h and the chassis m I introduce suitable suspension springs N and upon the axle h I mount suitable traction wheels O.

The essential features above described are further illustrated in vertical view in Fig. 2 so far as they may there be properly indicated, the same reference letters being employed to designate particular parts as in Fig. 1.

In practice I place the engine with its driving shaft parallel to the rear axle of the vehicle and suspend it in a supporting cradle which is hung on suitable springs so that the entire engine may move up and down without causing such movements in the body of the vehicle, and in order that such suspension and such movement may not throw the engine shaft out of proper relation to the driven shaft I unite this suspending cradle to the driven shaft by means of rigid, pivoted rods, whereby all movements of the engine as a whole in an upward or downward direction must occur in lines of motion which are arcs of circles described with said driven shaft as a center. The gear wheels are mounted by means of ball or roller bearings so that they are free to rotate without movement of the shafts to which they are mounted, and are provided with friction clutches mounted in such position that any gear wheel is constrained to move with the shaft or axle on which it is mounted when the corresponding friction clutch is forced into contact therewith. By providing several pairs of such gear wheels, and equipping one or both of each pair with friction clutching means, it is obvious that that pair of gear wheels will be operative at any time during which its friction clutching means is operative; while other pairs, with their friction clutching means out of use, will not be compelled to rotate with their shafts. In order to allow for the movement at different speeds of the two rear wheels of the vehicle, as required in rounding corners, I may introduce a differential gear into the rear axle at some point between the gears thereon and one or the other of the two rear wheels.

It is obvious that, with the rotation of the engine shafts, the rotation of the axle can be accomplished by means of any one pair of gear wheels in which at the time the friction clutches are closed. The other sets of gear wheels, their clutches now remaining open, will not revolve, but will remain in mesh, ready to operate immediately upon the closing of their clutches. For the purpose of enabling the reversal of transmitted motion for reversing the direction of propulsion of the vehicle I provide one set of gears as described with an intermediate gear whereby instead of one of such gears directly operating its companion gear it may do so through the intermediate gear and thus cause the reversal of the direction.

I preferably make the friction clutches upon the driving shaft heavy enough to take the place of a fly wheel and fasten them so that they must rotate with said shaft, and it is obvious that with such arrangement a fly wheel is dispensed with. It is obvious that the engine shaft may be continuously rotated and its rotation communicated to the axle and discommunicated without causing any gear to make or break its position of meshing with another gear; and that no gear, except such as are in direct action for transmitting power, will be in operative rotation at any time. It is also obvious that by connecting and disconnecting the appropriate clutches, speed may be changed from one gear to another without disconnecting power from the drive shaft and without straining the mechanism of the vehicle. It is also obvious that by applying any friction clutch gradually the speed corresponding to its gear will be acquired gradually by its axle.

The means here described for suspending the engine in a cradle pivoted to the axle allow that engine to move bodily in arcs of circles having the center line of the rear axle as center, and it is obvious that such movement may occur with relative freedom even when the transmitting gears are in operation. Moreover this arrangement causes the weight of the engine to be added to the drive axle in great measure, thus enabling lighter vehicle frames and easier construction. It is further evident that, with a pair of gear wheels acting in the manner described for propelling the vehicle forward, the tendency of the engine shaft will be to rotate in a downward direction (when it is hung behind the axle); and, as this is prevented by the spring suspension of the engine-containing cradle, all such tendency will be transmitted to the axle and added to the effective downward pressure thereon, thus increasing its tractive efficiency, and withdrawing by so much from effective weight on the front wheels. Thus all tendency of the driving wheels to slip will be lessened. Moreover when suddenly applying the power of the engine to the axle, the torque thus produced will cause the engine cradle to sink down in its spring suspension and the energy thus temporarily imparted to the springs will lessen the strain induced in the axle by starting up. This will materially assist the operation of starting up.

This system of power transmission enables me readily to place in its best mode of operation the type of engine described in my U. S. Patent No. 902,692 for I can place this engine at one end of the drive shaft and the gears at the other end thereof, and apply to the positions of said shaft intermediate between the cylinders of a muticylinder engine the patented devices shown in that patent whereby certain cylinders may be thrown into and out of use at will. A further advantage of this new system is that, in removing all engine mechanism from the forward part of the vehicle, I am enabled to place all passenger seats farther forward where the vehicle affords easier riding conditions, and to remove from in front of the passengers all heat and smell of the motive power.

Having thus described my invention, what I claim as new and useful is:—

In a power generating and transmitting apparatus, a plurality of engine cylinders $b$ $b'$ and a shaft operated thereby and known as the driving shaft $a$, a second shaft parallel to said driving shaft and herein known as the axle $h$, a plurality of gears $e$, $f$, $g$ mounted upon said driving shaft, a plurality of gears $e'$, $f'$, $g'$ mounted upon said axle in position to make operative contact with the said gears upon the driving shaft, a plurality of clutches $c$, $c'$, $d$, $d'$ whereby said operative contact may be made and broken between any one of said gears on driving shaft, and the corresponding gear on axle, a rigid frame $m$ such as an automobile chassis, and resilient means K for carrying said cylinders; shaft gears and clutches; resilient means $n$ for attaching said axle to said frame; rigid connecting arms J secured to said cylinders and shaft and so pivoted to said axle that all motion of displacement undergone by said cylinders and shaft relatively to said axle is constrained to occur in the arcs of circles of which the axial line of said axle is the center; a clutch L carried on said driving shaft whereby a portion of said driving shaft together with the engines thereto connected may be rendered inoperative; and a differential gear I mounted on said shaft.

JOHN C. SHERMAN.

Witnesses:
MABEL A. SHERMAN,
THOS. H. SHERMAN.